Figure 1:
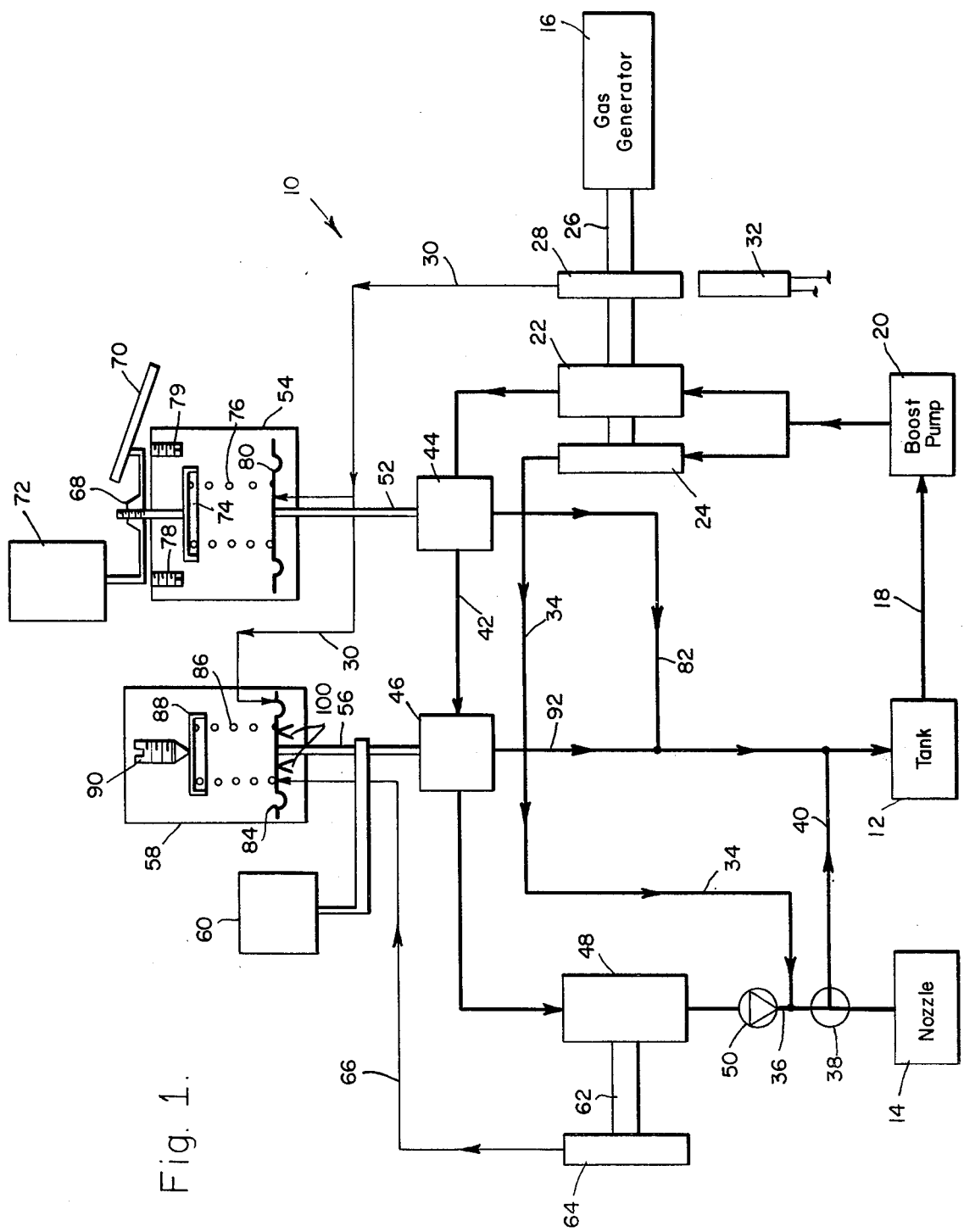

United States Patent [19]

Riple

[11] 4,134,257

[45] Jan. 16, 1979

[54] GAS TURBINE FUEL DELIVERY AND CONTROL SYSTEM

[75] Inventor: James C. Riple, Culver City, Calif.

[73] Assignee: The Garrett Corporation, Los Angeles, Calif.

[21] Appl. No.: 738,199

[22] Filed: Nov. 3, 1976

[51] Int. Cl.² ............................ F02C 9/06; F02C 9/08
[52] U.S. Cl. ................................ 60/39.03; 60/39.28 R
[58] Field of Search .................. 60/39.28 R, 39.28 T, 60/39.03

[56] References Cited

U.S. PATENT DOCUMENTS

| | | | |
|---|---|---|---|
| 2,725,932 | 12/1955 | Ballantyne et al. | 60/39.28 R |
| 3,225,814 | 12/1965 | Capwell | 60/39.28 R |
| 3,469,397 | 9/1969 | Parker | 60/39.28 R |
| 3,508,395 | 4/1970 | Sebestyen | 60/39.28 R |
| 3,721,088 | 3/1973 | Lewis | 60/39.28 R |
| 3,808,801 | 5/1974 | Taylor | 60/39.28 R |
| 3,832,846 | 9/1974 | Leeson | 60/39.28 R |
| 3,854,287 | 12/1974 | Rembold | 60/39.28 T |
| 3,899,886 | 8/1975 | Swick | 60/39.28 R |

Primary Examiner—Robert E. Garrett
Attorney, Agent, or Firm—Joel D. Talcott; Albert J. Miller

[57] ABSTRACT

A fuel control system for a gas turbine engine provides fully optimized performance with combined mechanical and electronic control system components. In the event of electronic system failure, the mechanical component system operates the engine at a safe, reduced performance level.

23 Claims, 2 Drawing Figures

GAS TURBINE FUEL DELIVERY AND CONTROL SYSTEM

This invention relates to gas turbine engines and, more particularly, to a fuel delivery and control system which can provide optimum engine performance throughout a wide range of operating conditions, provides safe operation at a reduced performance level in case of electronic system failure and avoids the need for the high cost electronic or mechanical components previously required for optimizing gas turbine fuel delivery.

As is well known to those skilled in the art, gas turbine engines can be of the single spool variety or may have a plurality of spools. Whatever the construction, however, a turbocompressor in the gas turbine engine functions as a gas generator, combining compressed air from the compressor portion with fuel injected by an appropriate nozzle means to generate hot, pressurized gases for powering the turbine portion and to provide power for the remaining portions of the engine. Gas turbine engines are highly complex structures requiring substantial care in manufacture so that the turbocompressors will exhibit proper aerodynamic characteristics to permit operation at high rotational velocities.

The fuel fed to the nozzles must also be precisely controlled to facilitate optimum operation of the engine. A fuel control system for this purpose must provide proper fuel metering during constant speed operation, as well as during acceleration and deceleration. Prior art fuel control and delivery systems have, of necessity, been quite complex in construction and operation to provide the varied control modes required for the engine.

A particular problem resides in the provision of an acceleration schedule for the gas generator spool of the engine. As the speed of the engine is increased, it is desired that the gas generator spool rotational velocity increase as rapidly as possible. However, too rapid an acceleration may result in the establishment of a surge condition which can be highly damaging or destructive to the engine. Accordingly, a fuel control system should establish an acceleration schedule which approaches surge level as closely as possible without jeopardizing the structural integrity or safe operation of the engine.

Because the precise conditions under which a gas turbine engine will go into surge may change with variations in several parameters, such as ambient pressure and temperature, gas generator inlet temperature, spool speeds, etc., the relevant parameters must be constantly monitored to vary the acceleration schedule as changes are noted. To accomplish this in prior art systems, highly complex mechanical and pneumatic systems were often used. However, the complexity of such systems required substantial material and resulting weight disadvantages. Also, these control systems were very expensive to purchase and to repair.

It has been found that the weight and expense problems can be somewhat alleviated by utilizing electronic fuel control systems. However, the reliability of these delicate electronic components in the hostile environment of a gas turbine engine has always been questioned. Additionally, should such an electronic fuel control system fail, operation of the gas turbine engine would cease. This is a highly undesirable characteristic for engines used in ground vehicles and is totally unacceptable in an engine designed for use in an airplane.

In accordance with this invention, a mechanical fuel delivery and control system for a gas turbine engine is constructed of conventional and structurally simple components to determine idle speed, operational speed range and acceleration and deceleration schedules. The provided operating range is well within safety limits of the engine and the simple and rugged components minimize the risk of failure disabling the engine during operation.

So that engine operation may be optimized, electronically controlled relays trim the speed range and acceleration schedule so that the best possible performance can be achieved. Should the electronic systems fail for any reason, the mechanical portion of the gas turbine fuel delivery and control system is fully capable of providing safe operation for the engine at a reduced performance level until repair can be effected.

Figure 2:
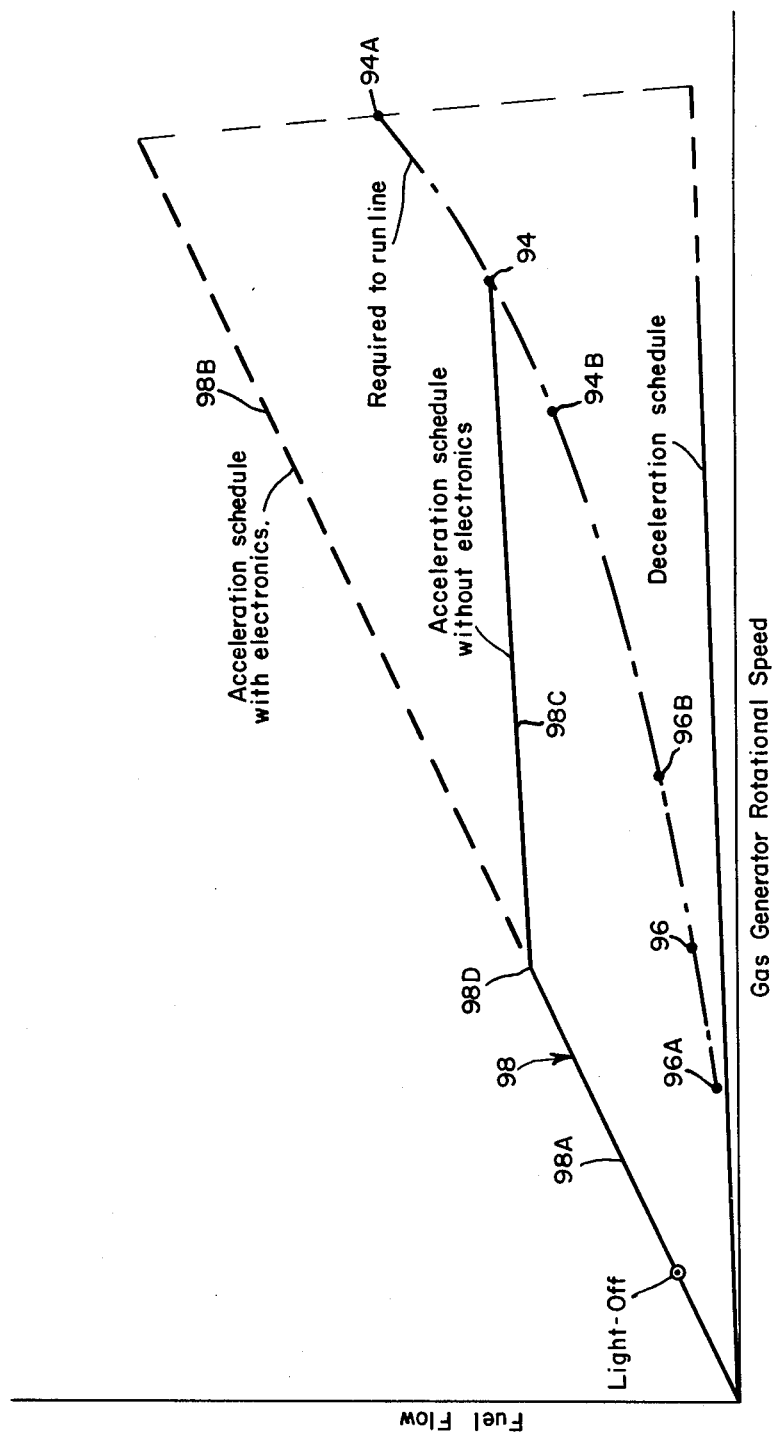

The advantages of the gas turbine fuel delivery and control system of this invention may be best understood when the following specification is considered in conjunction with the appended drawings, wherein:

FIG. 1 is a schematic view of a fuel delivery and control system in accordance with this invention; and FIG. 2 is a graph of fuel flow vs. gas generator rotational speed showing operation of the fuel delivery and control system of FIG. 1.

Referring now to FIG. 1, a fuel delivery and control system 10 is illustrated for providing fuel from a tank 12 to a combustor nozzle 14 so that the rotational velocity of a turbine engine gas generator 16 may be controlled.

Fuel from the tank 12 is fed through suitable tubing 18 through a boost pump 20 for increasing fuel pressure to a desired level and fed to a main flow fuel pump 22 and a deceleration schedule fuel pump 24. Each of the fuel pumps 22 and 24 is coupled to a drive shaft 26 of the gas generator 16 and is driven thereby to provide fuel flow at a rate which increases generally proportionally with gas generator velocity. Also mounted on the gas generator drive shaft 26 is a hydraulic speed signal generator 28 which generates, through suitable tubing 30, an output pressure signal which is proportional to gas generator drive shaft velocity and is used in controlling speed and acceleration in a manner which will be subsequently described. An electronic monopole speed sensor 32 may be operably associated with the hydraulic speed signal generator 28 to produce an electrical output proportional to gas generator drive shaft speed. This signal serves as one of the inputs to electronic trim control circuits for the system.

Fuel from the deceleration schedule fuel pump 24 flows through suitable tubing 34 to a nozzle fuel feed tube 36 which is connected through a bypass valve 38 to the nozzle 14. The bypass valve 38 is controllable to either permit fuel flow to the nozzle 14 or to prevent combustion by returning all fuel to the tank 12 through suitable tubing 40.

Fuel from the main flow fuel pump 22 is fed via suitable tubing 42 through a speed control bypass valve 44, an acceleration control bypass valve 46, a fuel metering motor 48 and a check valve 50 to the nozzle fuel feed tube 36. The speed control bypass valve 44 is coupled by mechanical linkage 52 to a speed control actuator 54. The acceleration control bypass valve is coupled by mechanical linkage 56 to an acceleration control actuator 58 and an acceleration control electronic trim circuit 60. The fuel metering motor 48 is coupled by a shaft 62 to a hydraulic fuel flow signal generator 64 which is similar to the speed signal generator 28 and transmits, through suitable tubing 66, a pressure which is generally proportional to fuel flow through the fuel metering motor 48.

The purpose of the speed control actuator 54 is to control fuel flow through the bypass valve 44 to determine the operating speed of the gas generator 16. The speed control actuator 54 is mechanically coupled by linkage 68 to a manually operated speed control 70 which may be, as illustrated, an accelerator pedal in the case of a truck or other such ground vehicle or may be a hand control such as typically is used in an aircraft. Linkage 68 is also connected to a speed control electronic trim circuit 72. Both the accelerator pedal 70 and electronic trim circuit 72 provide controlling input to the speed control actuator 54 moving spring guide 74 to compress a spring 76 is greater speed is desired and to loosen the spring if less speed is desired. Set screws 78 and 79 determine the upper limit of speed which may be called for by the speed control actuator 54.

The spring 76 presses against a diaphragm 80 and this force is balanced by the pressure generated by the hydraulic speed signal generator 28. The mechanical linkage 52 couples the diaphragm 80 to the speed control bypass valve 44 so that, when the thrust provided by the spring 76 against the diaphragm 80 is greater than the speed signal from the generator 28, a greater portion of the fuel fed into the bypass valve 44 is permitted to continue toward the nozzle. When speed signal generator output is greater than the force provided by the spring 76, the diaphragm 80 is biased upward causing the speed control bypass valve to divert a greater amount of fuel through tubing 82, returning it to the fuel tank 12.

The acceleration control actuator 58 includes a diaphragm 84 which controls the acceleration control bypass valve 46 through the linkage 56 based on the relative balance of the speed signal from the hydraulic fuel flow signal generator 64 on the one side and the sum of a speed signal from the hydraulic speed signal generator 28 and the force of a spring 86 on the other side. The position of a spring guide 88 for determining the force of the spring 86 is established by a set screw 90. As will be shown, the set screw 90 determines the rotational velocity of the gas generator at which the slope of the acceleration schedule is changed.

If the signal from the fuel flow signal generator 64, which is indicative of the fuel flow to the nozzle 14 through the fuel metering motor 48, is small as compared to the signal from the speed signal generator 28, which is indicative of gas generator speed, the acceleration control bypass valve permits a greater flow of fuel to the fuel metering motor and the nozzle 14. If, however, the output of the generator 64 indicates a large flow fuel through the motor 48 compared to the gas generator shaft speed as shown by the output of the generator 28, the bypass valve 46 causes a greater portion of the fuel flow to be diverted through tubing 92 to return to the fuel tank 12.

The speed control actuator 54 functions to set the upper and lower limits of rotational velocity of the gas generator which may be manually set by an operator through movement of the accelerator pedal 70. When the accelerator pedal 70 is released, the position of the spring guide 74 determines the force applied to the spring 76 against the diaphragm 80. This establishes the minimum throttle speed setting for the gas generator. The diaphragm 80 will maintain a position at which the force of the spring 76 is balanced by the pressure signal transmitted from the hydraulic speed signal generator 28 through the tubing 30. At this position, fuel flow through the speed control bypass valve 44 to the nozzle 14 will be at a rate which maintains this speed. Any variation in the speed of the gas generator 16 will be transmitted to the diaphragm 80 as a change in signal from the speed signal generator 28 and cause more or less fuel to be returned to the fuel tank 12 by the valve 44 so that a feed back circuit is created which will maintain the set speed.

As the accelerator pedal 70 is depressed, the force of the spring 76 increases against the diaphragm 80 so that a greater speed signal from the generator 28 is required to balance it. Thus, gas generator velocity is permitted to increase. The upper limit for the gas generator velocity is determined by the setting of the set screw 79 which limits travel of the accelerator pedal 70 and thus limits compression of the spring 76.

Referring now to FIG. 2, which is a graph fuel flow plotted against gas generator rotational speed, the limits of velocity established by the speed control actuator 54 are shown as an upper limit 94 and a lower limit 96 on the operational curve designated "Required to run line". By the action of the speed control actuator 54 alone, settings of the accelerator pedal 70 will cause the gas generator to rotate at a velocity between the upper and lower limits 94 and 96 dependent on the fuel flow provided in accordance with the schedule shown.

Both the upper and lower limits may be extended by operation of the speed control electronic trim circuit 72, which may be any of numerous electronic circuits utilized for speed control. This circuit, responsive to its input information, will cause repositioning of the linkage 68 to alter the state of compression of the spring 76 resulting from manual positioning of the accelerator pedal 70. Thus, the upper limit of operation on the required to run line can be extended to its extreme point 94A or limited to point 94B or set at any point between the limits 94A and 94B as is determined to be permissible by the trim circuit 72 without causing an overheating condition of the gas generator. In the same manner, the lower limit 96 can be extended to the extreme lower limit 96A or limited to point 94B or set at any point between the limits 96A and 96B as is permitted by the operating parameters.

Thus, the mechanical speed control actuator provides a safe operating range for the gas generator rotational velocity which may be extended in either direction by operation of the speed control electronic trim circuit 72 in a very precise manner in accordance with the parameters sensed. If, however, failure of the speed control electronic trim 72 should occur, safe operation of the gas turbine engine may be continued within the limits established by the speed control actuator 54.

Deceleration of the gas generator should be substantially linear as shown by the line designated "Deceleration schedule" in FIG. 2. This deceleration schedule is controlled entirely by the deceleration schedule fuel pump 24. This pump is coupled to the drive shaft 26 and produces a fuel flow rate proportional to gas generator rotational speed. This fuel is fed directly to the nozzle 14 as no additional control by either the speed control actuator or acceleration control actuator is required. The check valve 50 is provided in the nozzle fuel feed tube 36 to prevent any back flow of fuel from the deceleration schedule fuel pump during deceleration operation wherein no fuel is being fed through the fuel metering motor 48.

The flow of fuel through the deceleration schedule fuel pump continues during all operation of the gas turbine engine. Accordingly, during acceleration and constant speed running modes, the flow of fuel through the main flow fuel pump 22 is added to the flow through the deceleration schedule fuel pump 24 to provide the fuel flow rates designated as required in the schedule of FIG. 2.

During acceleration, the fuel having passed through the speed control bypass valve 44 must be further controlled to prevent over speed and over heating configurations which can occur during accleration. Accordingly, the fuel is passed through the acceleration control bypass valve 46 for control by the acceleration control actuator 58.

The maximum permissible acceleration schedule is shown by a straight line 98 (FIG. 2) which has a solid portion 98A and a dashed portion 98B. This is simply illustrative of the total fuel flow rate provided by the sum of the main flow fuel pump 22 and deceleration schedule fuel pump 24 when full flow is called for by the position of the accelerator pedal 70. During the lower speed ranges of the gas generator, this rate is perfectly safe as a maximum acceleration rate. However, at higher speed ranges, typically the range in excess of about 35% of full speed, very close control of operating parameters, such as that which may be provided by the acceleration control electronic trim 60 is necessary to safely accelerate at that rate. Accordingly, the acceleration control electronic trim may, if called for by its reading of the parameters, control the mechanical linkage 56 operating the acceleration control bypass valve 46 to cause acceleration to be at the rate shown by the acceleration schedule 98B or anywhere below that schedule as required by existing conditions. However, if the acceleration control electronic trim 60 is not operational, it is necessary that safe mechanical control be provided that will cause acceleration to be held within safe ranges such as that shown by the acceleration schedule portion 98C and designated "Acceleration schedule without electronics".

In mechanical operation of the acceleration control actuator, the rate of fuel bypassed for return to the tank 12 by the bypass valve 46 is controlled by position of the diaphragm 84. Initially, the diaphragm 84 is resting against stops 100. As long as the diaphragm is held against these stops by the spring 86, the acceleration control bypass valve will permit all flow to pass to the nozzle 14. Coupled with the spring 86 in holding the diaphragm 84 against the stops 100 is the output signal from the speed signal generator 28 indicative of gas generator shaft velocity. Working against this signal is the output of the signal generator 64 which is proportional to fuel flow rate through the fuel metering motor 48 to the nozzle 14.

At low gas generator rotational speed, the fuel rate is insufficient to overcome the speed signal and the force of the spring 86 so that acceleration can occur at a rate along the schedule portion 98A if called for by the operator of the engine. Although the output signal of the generator 64 is greater than that of the generator 28, no change in the acceleration schedule can occur until the spring force has been overcome. Thus, the point at which the scheduled acceleration rate changes, designated as 98D in FIG. 2, is controlled by compression of the spring 86 and thus by the setting of the set screw 90. After the output of the signal generator 64 has increased sufficiently to overcome the combined forces of the spring 86 and of the output of the speed signal generator 28, the diaphragm is lifted from the stops 100 and controls operation of the acceleration control bypass valve 46 returning fuel to the tank 12 at a rate sufficient to limit acceleration to the rate shown by the acceleration schedule portion designated 98C.

Operation of the acceleration control electronic trim 60 can, of course, set the permissible acceleration rate anywhere between the schedules 98B and 98C as demanded by its sensed inputs.

Thus, a gas turbine fuel delivery control system is provided which yields full optimum performance with combined mechanical and electronic control system components, many varied electronic controls being usable in the system and being well known to those skilled in the art. Should any or all of the electronic components fail, the mechanical system controls continued engine operation at a safe, reduced performance level. By use of this system, the safety of mechanical systems can be coupled with the improved performance of electronic systems or using relatively inexpensive components.

It will be readily understood that many variations in system structure, components, and operation may be made without departing from either the spirit or scope of this invention.

I claim:

1. In combination:

an engine having a rotating member;

a source of fuel for producing rotation of said member;

fuel pump means for pumping fuel to said engine;

means for driving said fuel pump means to increase fuel flow with increase in speed of said rotating member;

speed signal generator means for generating a speed signal indicative of rotational speed of said rotating member;

settable means for indicating a desired rotational speed for said rotating member;

valve means interposed between said fuel pump means and said engine for returning a portion of said fuel to said source;

diaphragm means operably coupled with said valve means for controlling the return of fuel to said source;

spring means operably associated with said diaphragm means and said settable means for biasing said diaphragm means to decrease the return of fuel to said source, compression of the spring means being controlled by said settable means;

means for applying the speed signal to said diaphragm means for biasing said diaphragm means to increase the return of fuel to said source;

deceleration fuel pump means for pumping fuel to said engine independent of said fuel control means; and means for driving said deceleration fuel pump to decrease fuel flow with decrease in speed of said rotating member.

2. In combination:

an engine having a rotating member;

a source of fuel for producing rotation of said member;

fuel pump means for pumping fuel to said engine;

means for driving said fuel pump to increase fuel flow with increase in speed of said rotating member;

speed signal generator means for generating a speed signal indicative of rotational speed of said rotating member;

flow signal generator means for generating a flow signal indicative of rate of fuel flow to said engine;

control means responsive to said inputs for controlling said fluid flow;

additional control means responsive to said signal for modifying operation of said control means; and acceleration control means in said control means for moderating fuel flow to said engine for limiting the rate of change of speed of said rotating member, said acceleration control means comprising:

valve means interposed between said fuel pump means and said engine for returning a portion of said fuel to said source;

diaphragm means coupled to said valve means for controlling the return of fuel to said source;

stop means for limiting travel of said diaphragm means in one direction;

biasing means operably associated with said diaphragm means for biasing said diaphragm means against said stop means;

means for applying said speed signal to said diaphragm means for biasing said diaphragm means in said one direction; and means for applying said flow signal to said diaphragm means for biasing said diaphragm means in an other direction opposite said one direction.

3. The combination of claim 2 wherein said control means is mechanical.

4. The combination of claim 2 wherein said control means includes speed control means for controlling rotation of said rotating member within a speed limit.

5. The combination of claim 4 wherein said additional control means includes speed control trim means for adjusting said speed limit.

6. The combination of claim 5 wherein said speed limit includes an upper speed limit and a lower speed limit.

7. The combination of claim 2 wherein said speed signal and flow signal are hydraulic.

8. The combination of claim 2 wherein motion of said diaphragm means in said one direction decreases the return of fuel to said source and motion of said diaphragm means in said other direction increases the return of fuel to said source.

9. The combination of claim 8 wherein said biasing means comprises a mechanical spring and said acceleration control means includes means for adjusting compression of said spring to prevent removal of said diaphragm means from said stop means until said flow signal is greater than said speed signal by a predetermined amount.

10. The combination of claim 2 wherein said additional control means includes acceleration control trim means for additionally controlling said valve means.

11. A method of controlling fuel flow from a source of fuel to an engine having a rotating shaft said method comprising the steps of:

generating inputs corresponding to rotating shaft speed, fuel flow rate and desired rotating shaft speed;

mechanically controlling fuel flow responsive to said inputs for engine operation in a safe operational mode; and electronically trimming said fuel flow control responsive to said inputs to provide engine operation in a substantially optimum, high performance operational mode;

said step of mechanically controlling fuel flow further comprising the steps of:

pumping fuel at a flow rate generally proportional to rotating shaft speed;

sensing inputs to determine the difference between rotating shaft speed and desired rotating shaft speed;

returning a portion of said fuel to said source to produce a proper fuel flow rate to equate said rotating shaft speed and said desired rotating shaft speed;

independently sensing inputs to determine the relation of fuel flow rate and rotating shaft speed; and returning a portion of said fuel to said source to limit acceleration of said rotating shaft to a predetermined schedule.

12. The method of claim 11 wherein the rotating shaft has upper and lower speed limits and the step of electronically trimming said fuel flow control comprises the steps of:

sensing additional inputs;

adjusting the upper and lower speed limits responsive to said additional inputs; and adjusting said acceleration schedule responsive to said additional inputs.

13. The method of claim 12 wherein said additional inputs include ambient pressure, ambient temperature, and gas generator inlet temperature.

14. The method of claim 11 wherein the step of pumping fuel includes the steps of:

providing a first flow of fuel to said engine to establish a deceleration schedule; and providing a second flow to fuel to the engine for controlling rotating shaft speed and acceleration.

15. A system for controlling delivery of fuel from a source of fuel to an engine having a rotating shaft, said system comprising:

means for pumping fuel from said source of fuel;

first valve means for receiving said fuel and passing a portion thereof;

second valve means for receiving fuel from said first valve means and passing a portion thereof to the engine;

mechanical speed control means for operating said first valve means to control rotating shaft speed between an upper and lower limit;

mechanical acceleration control means for operating said second valve means to control acceleration of said rotating shaft within an acceleration schedule;

electronic speed control trimming means for adjusting said rotating shaft speed upper and lower limit;

electronic acceleration control trimming means for adjusting said acceleration schedule;

means for driving said fuel pumping means to increase fuel flow with increase in speed of said rotating shaft;

additional means for pumping fuel from said source of fuel to the engine independent of said first and second valve means; and means for driving said additional fuel pumping means to increase fuel flow with increase in speed of said rotating shaft.

16. A system for controlling delivery of fuel from a source of fuel to an engine having a rotating shaft, said system comprising:

means for pumping fuel from said source of fuel;

first valve means for receiving said fuel and passing a portion thereof;

second valve means for receiving fuel from said first valve means and passing a portion thereof to the engine;

mechanical speed control means for operating said first valve means to control rotating shaft speed between an upper and lower limit;

mechanical acceleration control means for operating said second valve means to control acceleration of said rotating shaft within an acceleration schedule;

electronic speed control trimming means for adjusting said rotating shaft speed upper and lower limit; and electronic acceleration control trimming means for adjusting said acceleration schedule;

speed signal generator means for generating a speed signal indicative of rotating shaft speed; and flow signal generator means for generating a flow signal indicative of flow of fuel from said second valve means to the engine;

said mechanical acceleration control means comprising:

diaphragm means coupled to said second valve means for controlling the flow of fuel therethrough;

stop means for limiting travel of said diaphragm means in one direction;

biasing means operably associated with said diaphragm means for biasing said diaphragm mean against said stop means;

means for applying said speed signal to said diaphragm means for biasing said diaphragm means in one direction; and means for applying said flow signal to said diaphragm means for biasing said diaphragm means in an other direction opposite said one direction.

17. The system of claim 16 wherein motion of said diaphragm means in said one direction increases the flow of fuel to the engine and motion of said diaphragm in said other direction decreases the flow of fuel to the engine.

18. The system of claim 16 wherein said mechanical acceleration control means includes means for adjusting compression of said biasing means to prevent removal of said diaphragm means from said stop means until the flow signal is greater than the speed signal by a predetermined amount.

19. The system of claim 16 wherein said electronic acceleration control trimming means includes means for additionally controlling said valve means.

20. In a fuel control system having fuel pump means for providing fuel from a source to an engine having a rotating member, and including speed signal generator means for generating a speed signal indicative of rotational speed of said rotating member, and flow signal generator means for generating a flow signal indicative of rate of fuel flow to said engine, acceleration control means for moderating fuel flow to said engine to limit the rate of change of speed of said rotating member, said acceleration control means comprising:

valve means interposed between said fuel pump means and said engine for returning a portion of said fuel to said source;

diaphragm means coupled to said valve means for controlling the return of fuel to said source;

stop means for limiting travel of said diaphragm means in one direction;

biasing means operably associated with said diaphragm means for biasing said diaphragm means against said stop means;

means for applying said speed signal to said diaphragm means for biasing said diaphragm means in said one direction; and means for applying said flow signal to said diaphragm means for biasing said diaphragm means in an other direction opposite said one direction.

21. The combination of claim 20 wherein motion of said diaphragm means in said one direction decreases the return of fuel to said source and motion of said diaphragm means in said other direction increases the return of fuel to said source.

22. The combination of claim 21 wherein said biasing means comprises a mechanical spring and said acceleration control means includes means for adjusting compression of said spring to prevent removal of said diaphragm means from said stop means until said flow signal is greater than said speed signal by a predetermined amount.

23. The combination of claim 20 including acceleration control trim means for additionally controlling said valve means.

* * * * *